J. A. ALLISON.
REGULATOR VALVE FOR COMPRESSION TANKS.
APPLICATION FILED DEC. 30, 1907.
926,378.
Patented June 29, 1909.
2 SHEETS—SHEET 1.
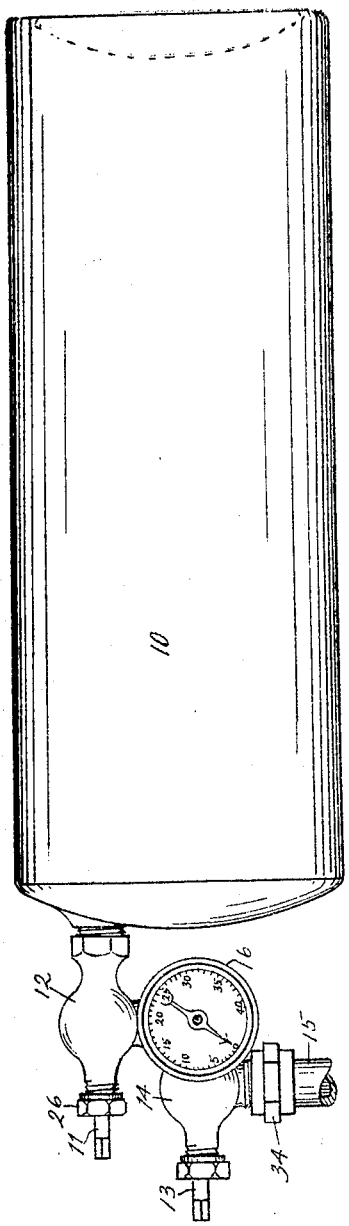
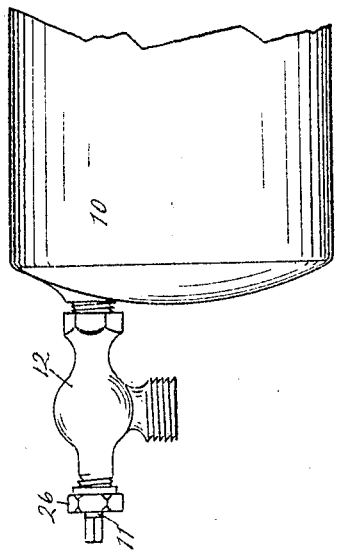
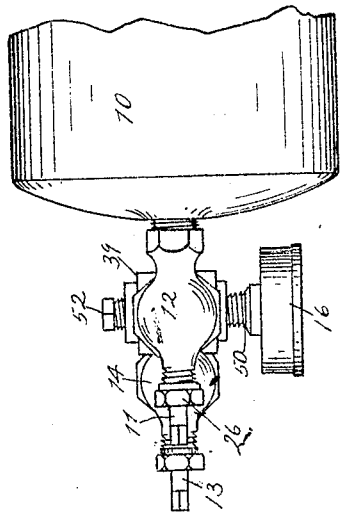
WITNESSES:
INVENTOR.
James A. Allison.
BY
ATTORNEY.

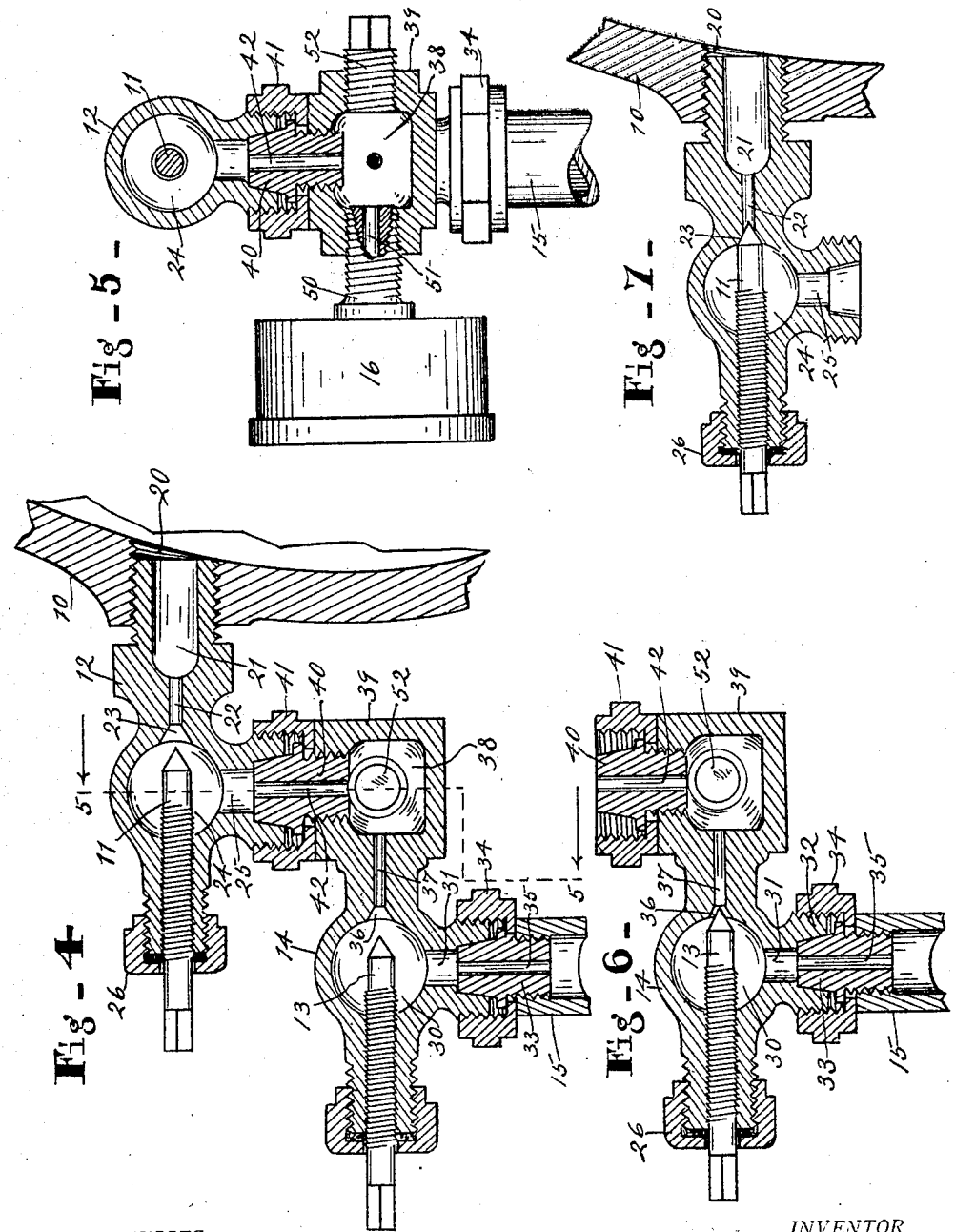

UNITED STATES PATENT OFFICE.

JAMES A. ALLISON, OF INDIANAPOLIS, INDIANA.

REGULATOR-VALVE FOR COMPRESSION-TANKS.

No. 926,378.

Specification of Letters Patent.

Patented June 29, 1909.

Application filed December 30, 1907. Serial No. 408,686.

*To all whom it may concern:*

Be it known that I, JAMES A. ALLISON, of Indianapolis, county of Marion, and State of Indiana, have invented a certain new and useful Regulator-Valve for Compression-Tanks; and I do hereby declare that the following is a full, clear, and exact description thereof, reference being had to the accompanying drawings, in which like numerals refer to like parts.

The object of this invention is to improve the valve and gage construction connected with the outlet of compression tanks.

The invention has been used in connection with acetylene gas tanks for automobiles.

One feature of the invention consists in connecting the service or line pipe with the tank by means including a plurality of independently operable valves, one to regulate the outlet from the tank and the other the inlet to the service pipe, whereby the outlet from the tank may be closed without changing or interfering with the adjustment of the valve which controls the inlet into the service or line pipe.

Along with the foregoing a further feature of the invention consists in making the two valves readily detachable, whereby the tank may be removed and be recharged or replaced without interfering with the adjustment of the valve that controls the passage of the fluid to the service or line pipe.

Another feature of the invention consists in combining with the parts above mentioned a pressure gage located intermediate the two valves so that the fluid under pressure coming from one valve acts upon the gage before it reaches the second valve, whereby the gage will indicate the pressure of the fluid in the tank and the outlet of the fluid from the tank, and when the outlet of the fluid from the tank has shut off the gage will be idle and not under strain and the adjustment of the valve controlling the inlet to the line pipe will be unchanged. To this end, between the said valves I locate a three-way chamber, an opening leading thereto from the first valve, another opening to the gage and a third opening to the second valve, whereby the gage can indicate the pressure of the fluid in the tank and the second valve can readily regulate the pressure or admission of fluid to the line pipe.

The nature of this invention will be understood from the accompanying drawings and the following description and claims.

In the drawings Figure 1 is a side elevation of an acetylene gas tank with my valve and gage construction secured thereto. Fig. 2 is a plan view of the left hand end of Fig. 1. Fig. 3 shows the left hand end of the tank and the valve controlling the outlet therefrom, as shown in Fig. 1 and as the same will appear when the tank is removed for recharging or replacing. Fig. 4 is a central vertical section through the valve mechanism and adjacent parts as arranged in Fig. 1, the tank and line pipe being partly broken away. Fig. 5 is a transverse section on the line 5—5 of Fig. 4, showing the gage in elevation. Fig. 6 is the lower part of Fig. 4 with the valve nearly closed for regulating the passage and pressure of fluid to the line pipe and showing the parts as they appear when the tank and tank valve are moved. Fig. 7 shows the upper part of Fig. 4 with the tank valve closed and with the parts as they appear when the tank and tank valve are detached.

In the drawings 10 represents an acetylene gas tank, 11 the gas tank valve controlling the outlet of fluid from the tank, 12 the casing for the gas tank valve which is secured to the gas tank, 13 the pipe line valve, 14 the casing for the pipe line valve which at one end is secured to the casing of the gas tank valve and at the other end to the line pipe 15.

16 is a pressure gage which is secured to one end of the casing 14 of the pipe line valve.

In detail there is a threaded opening 20 in one end of the tank which receives the threaded nipple of the casing 12 of the tank valve, there being a relatively large passageway 21, a diminished passage-way 22, a conical valve seat 23, a chamber 24, and a downwardly extending large passage-way 25 in said casing 12.

The valve 11 is a needle valve which screws through the outer end of the casing 12 on which there is a suitable packing cap 26.

The casing 14 for the pipe line valve 13 has a central chamber 30 and a downwardly extending large passage-way 31 through a downwardly extending threaded nipple 32 that is internally conical to receive the nipple 33 which at its lower end is externally threaded to screw into the service pipe 15. A union 34 connects the nipple 33 with the casing 14 and said nipple 33 has a narrow passage-way 35 that leads from the passageway 31 in the valve casing 32 to the pipe line 15.

The valve 13 is a needle valve formed, arranged and mounted like the valve 11 and adapted to close the valve seat 36 at the end of the narrow passage-way 37, that leads from a substantially rectangular chamber 38 in the substantially rectangular end 39 of the valve casing 14.

The two valve casings 12 and 14 are connected by the nipple 40 that has a conical upper end projecting into the downwardly extending nipple from the casing 12 and which is externally threaded at its lower end to screw into the rectangular end 39 of the casing 14. A union 41 connects the nipple 40 with the lower end of the valve casing 12. A narrow passage-way 42 extends through the nipple 40 and leads from the passageway 25 above into the rectangular passageway 38 below. This renders the valve casing 12 readily removable from the valve casing 14 by loosening the union 41.

The gage 13 has an externally threaded tubular shank 50 that screws into one side of the rectangular end 39 of the casing 14 and has a passage-way 51 through it that leads from the chamber 38 to the gage. Therefore, the chamber 38 is a three-way chamber, there being a passage into it from the tank through the tank valve casing, a passageway out of it to the line pipe through the line pipe valve casing, and a passage from another side to the gage. There is also a removable plug 52 closing an enlarged opening into the end 39 of the casing 14, as shown in Fig. 5, which renders said chamber accessible or permits a change of location of the gage.

From the foregoing description it will be plain that the parts may be turned and adjusted in any position that the location of the tank and other mechanism may require, which make the device universal in use. It is also seen that the valve 11 controls the passage of fluid under pressure to the chamber 38, to the gage, and through the service valve casing to the pipe line. Therefore, the pipe line valve 13 may be adjusted nicely for admitting the desired quantity of fuel to the pipe line under the desired pressure to produce the desired light, and that when said valve is so adjusted it may remain in such adjusted position when the tank valve is closed entirely, while the apparatus is not in use, or when the tank is being removed, recharged or replaced. Furthermore, when said tank valve is closed the gage will not be in use or under strain and yet when said valve is open it will indicate the tank pressure without interfering with the pressure in the pipe line, and this is brought about by an intermediate chamber between the two valves provided with three openings for the fluid entering the same.

What I claim as my invention and desire to secure by Letters Patent is:

1. A regulating valve mechanism for compression tanks including a tank valve mechanism, a pipe line valve mechanism separate from the tank valve mechanism, and intermediate means separable from both valve mechanisms for detachably uniting them through which the two valve mechanisms are in communication.

2. A regulating valve mechanism for compression tanks including a tank valve mechanism, a pipe line valve mechanism separate from said tank valve mechanism, a nipple that screws into connection with one of said valve mechanisms and projects into the other valve mechanism, and a union for connecting said nipple with the valve mechanism into which it projects, said parts having a passage-way through them, whereby the two valve mechanisms will be in communication.

3. A regulating valve mechanism for compression tanks including a tank valve mechanism, a pipe line valve mechanism, a chamber between said valve mechanisms with a passage leading from each of them into said chamber, a pressure gage, and a passage leading from said chamber into said pressure gage.

4. A regulating valve mechanism for compression tanks including a tank valve mechanism, a pipe line valve mechanism in communication with the tank valve mechanism and detachably secured thereto, and a pressure gage in communication with the passage between said valve mechanisms and located between the pipe line valve and the connection between the two valve mechanisms, whereby when the tank valve mechanism is removed the gage will remain with the pipe line valve mechanism.

5. A regulator valve mechanism for compression tanks including a tank valve casing with a passage therethrough, a pipe line casing with a passageway therethrough and a removable connection between said valve casings and having a passage therethrough in communication with the passages through said two valve casings, there being a substantially rectangular chamber in the pipe line valve casing from which passages through said connection and through the remainder of the pipe line valve casing extend.

6. A regulator valve mechanism for compression tanks including a tank valve casing with a passage therethrough, a pipe line casing with a passageway therethrough, a removable connection between said valve casings and having a passage therethrough in communication with the passages through said two valve casings, there being a substantially rectangular chamber in the pipe line valve casing from which passages through said connection and through the remainder of the pipe line valve casing extend, and a gage secured to the pipe line valve casing with a passage thereto from said rectangular chamber.

In witness whereof, I have hereunto affixed my signature in the presence of the witnesses herein named.

JAMES A. ALLISON.

Witnesses:
N. ALLEMONG,
V. H. LOCKWOOD.